United States Patent
Le Brun et al.

(10) Patent No.: US 11,435,707 B2
(45) Date of Patent: Sep. 6, 2022

(54) HYBRID SYSTEM FOR CONTROLLING AN AIRCRAFT AND METHOD FOR CONTROLLING THE SAME

(71) Applicant: SAFRAN AIRCRAFT ENGINES, Paris (FR)

(72) Inventors: Christophe Marc Alexandre Le Brun, Moissy-Cramayel (FR); Bogdan Cristian Liacu, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 225 days.

(21) Appl. No.: 16/637,669

(22) PCT Filed: Aug. 9, 2018

(86) PCT No.: PCT/FR2018/052051
§ 371 (c)(1),
(2) Date: Feb. 7, 2020

(87) PCT Pub. No.: WO2019/030460
PCT Pub. Date: Feb. 14, 2019

(65) Prior Publication Data
US 2021/0364994 A1    Nov. 25, 2021

(30) Foreign Application Priority Data
Aug. 9, 2017 (FR) ........................... 1757610

(51) Int. Cl.
*G05B 13/04* (2006.01)
*F02C 9/28* (2006.01)

(52) U.S. Cl.
CPC .............. *G05B 13/041* (2013.01); *F02C 9/28* (2013.01)

(58) Field of Classification Search
CPC .......... G05B 13/041; G05B 11/32; F02C 9/28
See application file for complete search history.

(56) References Cited

U.S. PATENT DOCUMENTS

| | | |
|---|---|---|
| 5,001,646 A | 3/1991 | Caldwell et al. |
| 5,274,558 A | 12/1993 | High et al. |
| 5,920,478 A | 7/1999 | Ekblad et al. |
| 7,890,198 B1 | 2/2011 | Gahinet |
| 2009/0281641 A1 | 11/2009 | Fuller |

(Continued)

OTHER PUBLICATIONS

International Preliminary Report on Patentability received for PCT Patent Application No. PCT/FR2018/052051, dated Feb. 20, 2020, 15 pages (8 pages of English Translation and 7 pages of Original Document).

(Continued)

*Primary Examiner* — Joseph J Dallo
(74) *Attorney, Agent, or Firm* — Womble Bond Dickinson (US) LLP

(57) ABSTRACT

The proposed aircraft engine control system includes at least one servo-loop, and at least one state feedback control integrated into the servo-loop. The state feedback control includes a static compensator (M) and a state corrector loop (L) which are parametrized so as to decouple the states constituted by the operating parameters of the engine to be servo-controlled. The mono-variable regulators are then in turn parameterized so as to servo-control the operating parameters on the setpoints.

12 Claims, 3 Drawing Sheets

(56) References Cited

U.S. PATENT DOCUMENTS

| | | | | |
|---|---|---|---|---|
| 2013/0008226 | A1* | 1/2013 | Quer | G01C 19/5776 |
| | | | | 73/1.82 |
| 2013/0158831 | A1* | 6/2013 | Djelassi | F02C 7/00 |
| | | | | 701/100 |
| 2013/0255221 | A1* | 10/2013 | Gaully | F02C 9/28 |
| | | | | 60/39.091 |
| 2013/0327880 | A1* | 12/2013 | Certain | G05D 1/0858 |
| | | | | 244/17.13 |
| 2015/0156734 | A1* | 6/2015 | Touret | H04W 72/0413 |
| | | | | 370/311 |
| 2019/0031359 | A1* | 1/2019 | Djelassi | B64D 31/06 |
| 2020/0086976 | A1* | 3/2020 | Joncour | B64C 9/08 |
| 2020/0094946 | A1* | 3/2020 | Bezivin | B64C 13/50 |

OTHER PUBLICATIONS

International Search Report and Written Opinion received for PCT Patent Application No. PCT/FR2018/052051, dated Oct. 9, 2018, 19 pages (9 pages of English Translation and 10 pages of Original Document).

Preliminary Research Report received for French Application No. 1757610, dated Apr. 26, 2018, 3 pages (1 page of French Translation Cover Sheet and 2 pages of original document).

Zames, G., "Feedback and Optimal Sensitivity: Model Reference Transformations, Multiplicative Seminorms, and Approximate Inverses", IEEE Transactions on Automatic Control, vol. 26, Apr. 1981, pp. 301-320.

\* cited by examiner

HYBRID SYSTEM FOR CONTROLLING AN AIRCRAFT AND METHOD FOR CONTROLLING THE SAME

GENERAL TECHNICAL FIELD

In order to optimize the performance of aircraft engines (turbomachines) over the entire flight envelope, one of the possible leverages is to add "variable geometries" (relief valves, vanes or blades with variable pitch, shutters of variable section nozzle, etc.). In a general manner, the variable geometries are members provided with movable elements the position of which can be piloted to vary parameters such as the flowing of a gas flow, and which thus allow having degrees of freedom over the operability of the turbomachine. They are typically piloted by a calculator, and their actions must be coordinated to be optimal in terms of performance and stay within the acceptable limits of operability and operational safety of the turbomachine (in particular in terms of pressure, temperature, speeds of revolution, torques . . . ).

Generally, this is about a multivariable system when a system has several inputs and/or several outputs. Conventional mono-variable architecture and setting strategies are generally not suitable for these systems due to the interactions between the different variables.

Case of Turboprop

A turboprop is conventionally consisting of a gas generator (turbine) driving a variable pitch propeller.

The main purpose of the turboprop regulation system is to provide the required thrust while maintaining a constant speed of rotation of the propeller. From a control point of view, a turboprop can be seen as a multivariable system comprising:

two input variables:
the fuel flow, which will be noted WF,
the propeller pitch (also called the pitch angle), which will be noted B;
two output variables:
the propeller power, which will be noted SHP,
the propeller speed of rotation, which will be noted XNP.

Generally, the power SHP is controlled by the action of the fuel flow WF, while the propeller speed of rotation XNP is controlled by the action on the propeller pitch B. The speed XNP is servo-controlled around several speed levels, defined in relation to the flight conditions and in relation to the state of the turboprop.

The main problem with regulation is that the request for a variation in power $SHP_{ref}$ leads to an unwanted variation in the propeller speed of rotation XNP. Likewise, the variation in the propeller speed request $XNP_{ref}$ affects the power of the gas generator SHP. This is due to the fact that each of the controls acts on each of the outputs.

These disturbances are highly detrimental to the turboprop. They lead in particular to significant over-torques which damage the components in fatigue, and particularly the reducer.

Other Examples of Applications

The engine controls from other applications are also concerned.

This is the case for example of the control of an engine having a doublet of unducted counter-rotating propellers (or "Open-Rotor" according to the terminology generally used in the field), which is an application similar to a turboprop from the control point of view: the system uses three input variables (the fuel flow and the respective pitches of the two counter-rotating propellers) to control three output variables (the speed of revolution of the low pressure body and the speeds of revolution of each of the two propellers).

This is also the case of turbojet engines for which the nozzle section can be piloted in addition to the fuel flow. This additional degree of freedom mainly allows varying the gas ejection speed and consequently the thrust.

Different variable geometries can also be integrated into turbojet engines. Although the setpoints of variable geometries and of the fuel flow of a turbojet engine are developed in coordination, the controls (servo valve currents) thereof are synthesized independently and can affect certain common operating parameters such as the speeds of revolution or the operability line of the compressors.

Main Objectives for the Synthesis of Control Laws

The main objectives for the synthesis of control laws for these systems are as follows:

Compliance with the specifications given by the list of requirements (response time, overshoot, stability margins), Limitation of the interactions between the different variables: the setpoint variation of one of the variables must cause the smallest possible difference on the other variables, Robustness of the control to disturbances and modeling uncertainties.

Apart from the performance objectives, the control laws must be easily adjustable and of a reasonable complexity to facilitate their setting, their adjustment in tests and their implementation in the calculators.

Existing Multivariable Control Solutions with Decoupling

In these approaches, the control laws are synthesized from a linear model identified around operating points. The diagrams of the following prior art systems are presented with linear turboprop models. These models are noted G when the transfer matrix formalism is used. When the state formalism is used, the turboprop model consists of state, control and output matrices A, B and C (the direct action matrix D being zero in the considered engine control applications).

As illustrated in FIG. 1, approaches called H2, H∞ type centralized approaches (like that described in the document G. Zames, *Feedback and Optimal Sensitivity Model Reference Transformations, Multiplicative Seminorms, and Approximations*, IEEE Transactions on Automatic Control, vol. 26, issue no° 4, 1981) are known.

These approaches allow synthesizing a multivariable corrector 11 directly taking into account the power SHP and the speed XNP of the propeller.

Although these solutions are relatively efficient, their development requires significant calculations, and the correctors obtained are generally complex. Moreover, these control laws are not intuitive, which constitutes an obvious problem for adjusting the settings during engine tests.

As illustrated in FIG. 2, state feedback controls (of the pole placement method type, quadratic linear control method) are also known. These methods consist in adding a feedback including a state feedback 12. Integral action terms 13 are generally added to the feedback 12 in order to obtain good performance.

As these methods are not focused on the decoupling, the interactions between Power SHP and Propeller XNP loops generally remain very significant. Moreover, the state feedback controls are difficult to adjust on the engine test bench.

As illustrated in FIG. 3, state feedback decoupling approaches (such as for example the Falb-Wolovich synthesis (described in "Multivariable control and estimation", Ostertag, 2006) or the complete modal synthesis) are known. These methods consist in adding a feedback including a state feedback 14 and a static compensation M 14b to decouple the system.

The advantage of these methods is that they allow total decoupling, with relatively simple correctors.

However, these methods are not compatible with adding integral actions. Indeed, these methods are based on the movement of a limited number of poles depending on the system, and the fact of adding integrators and therefore unstable poles leads to move them instead of the poles of the system. The performances obtained are then insufficient, in particular in terms of rejection of disturbances. Moreover, the state feedback controls are difficult to adjust in practice.

As illustrated in FIG. 4, there are also known frequency decoupling methods (such as pseudo-diagonalization, decomposition into eigenvalues and singular values, simplified decoupler, or ideal decoupler) which allow the system to be decoupled using compensators 15, before using mono-variable regulators 16 of the PID type allowing the system to be servo-controlled.

The advantage of these methods is that the steps of synthesizing the compensators 15 and the mono-variable regulators 16 are distinct. It is therefore relatively simple to adjust the settings of the mono-variable regulators 16 a posteriori.

The problem is that simple compensators are generally unable to provide satisfactory decoupling. A suitable or perfect decoupling can only be achieved by using complex compensators, difficult to implement and interpolate.

Some methods consist in implementing only the compensation matrix 15 such as biases to be added on the controls to compensate for the disturbances of the different loops. The problem with these methods is that the biases are difficult to calculate and not always sufficiently accurate.

The previous approaches allow:
obtaining an average decoupling, or
obtaining a correct decoupling, at the cost of relatively complex control laws and synthesis methods.

An aircraft engine system is also known from document U.S. Pat. No. 5,274,558, which includes:
a servo-loop which receives as input a torque setpoint QCMD;
a rotation speed loop (FIG. 3—speed setpoint NPSFLT).

The system also comprises a decoupling block 18, 35 which provides a signal indicating the decoupled torque QDC which allows decoupling the torque loop from the speed loop, so that only the speed loop reacts to sudden changes in the engine speed of revolution.

No state feedback control is considered there.

Document U.S. Pat. No. 5,001,646 describes an electric flight control system (according to the terminology "fly-by-wire") of a helicopter.

This system includes at least one servo-loop which receives as input parameter setpoints (roll, pitch, yaw, vertical) coming from a control stick.

A feedback loop controls the engine operating parameters.

This system also does not provide a state feedback control.

Document U.S. Pat. No. 5,920,478 in turn describes a servo-loop generic dynamic control system.

A decoupling processes the MIMO data to convert them into data allowing simple mono-variable SISO processing, while taking into account the complex interactions between the variables.

The decoupling used is not of the state feedback type, but corresponds to the decouplings presented above with reference to FIG. 4. As already indicated, these decouplings have the disadvantage of not allowing satisfactory decoupling, except at use of particularly complex compensators.

GENERAL PRESENTATION OF THE INVENTION

A general purpose of the invention is to guarantee the desired performance, in particular in terms of decoupling, while preserving the possibility of regulating the correctors in a simple and intuitive manner.

To this end, an aircraft engine control system is proposed which includes:
at least one servo-loop which receives as input engine operating parameter setpoints and which controls the system with a feedback loop on these operating parameters, said servo-loop including a mono-variable regulator decentralized control,
at least one state feedback control integrated into the servo-loop, said control receiving as input the outputs of the mono-variable regulator decentralized control and being a feedback loop between the operating parameters of the engine and the outputs of said decentralized control, said feedback loop providing the engine control parameters,
the state feedback control being configured to decouple the operating parameters, the mono-variable regulators of the decentralized control being configured to servo-control the operating parameters on the setpoints of these parameters.

Decentralized control here means a control which is not centralized, but which uses a plurality of local and independent control laws for the different subsystems to be controlled.

The feedback control may include a static compensator and a state feedback corrector loop, said static compensator and said state feedback corrector loop being configured to decouple the operating parameters.

Such a system combines the advantages of the state feedback decoupling solutions and the frequency decoupling methods.

In particular, the design of the decoupling and the regulators are separate.

The decoupling being carried out by a state feedback decoupling approach, it is then possible to ensure a total decoupling with a very simple state corrector L and a compensation matrix M, while retaining, unlike conventional decoupling methods, the main dynamics of the method (which results, in a matrix arrangement, in values equal to 0 on non-diagonal elements, and non-zero values on diagonal elements).

Thus, the reduction of the couplings is very effective. Furthermore, the decoupling state feedback consists of two simple gain matrices: state feedback and static compensation.

The mono-variable regulators of the decentralized control are advantageously proportional correctors/integrators (PI correctors).

PI correctors allow ensuring the desired performance.

They have the advantage of being simple and their settings are facilitated due to the decoupling. Moreover, they can easily be adjusted/reset, regardless of the decoupling state feedback. These adjustments/resettings can be carried out during the design phases, during tests on test benches, but also during the life of the turboprop. Indeed, the behavior of the system is modified during the aging thereof. It is then possible to adapt the PI correctors for the purpose of maintaining the desired performance (in particular in terms of response time and overshoot).

The invention also concerns a method for parameterizing an aircraft engine control system according to any of the preceding claims, including steps consisting in:
- defining a linear engine model, the model having a transfer function and a state representation;
- defining a static compensator and a state feedback corrector so as to decouple the states constituted by the operating parameters of the engine to be servo-controlled;
- defining the mono-variable regulators so as to servo-control said operating parameters on the setpoints.

A mixed decoupling is thus carried out by which:
- the decoupling is carried out by a state feedback,
- regulators (in particular, PI regulators) are synthesized from the decoupled method by state feedback.

In particular, the state feedback corrector and the static compensator can be configured so that the transfer function of the control system has gains and poles corresponding to those of the transfer function of the engine model.

The method may further include a step of interpolating the mono-variable correctors depending on flight condition variables.

The parameters of the mono-variable correctors can be interpolated individually by gain sequencing.

The method can also include a step of interpolating the state feedback corrector and the static compensator depending on flight condition variables.

The invention further concerns the use of the proposed system for various applications.

It will be noted that the solution proposed by the invention is particularly effective in the case of systems considering 2 or 3 controls and outputs, a larger number of variables being able to be considered, but where appropriate with less accurate results. The control laws are in fact generally synthesized on a nominal linear model. As this model is never perfect, the control laws generally do not ensure the same level of performance on the non-linear model. The same goes for the decoupling, which is known to be quite sensitive to model uncertainties. The matrices M and L take into account all the transfers of the multivariable system and risk being less accurate when the number of variables increases.

In the case of the control of an engine having a variable pitch propeller, such as a turboprop, the servo-controlled operating parameters comprise the power of the propeller (SHP) and the speed of rotation (XNP) thereof, the controlled parameters comprising the fuel flow and the propeller pitch.

In the case of a control of an engine having a doublet of variable pitch counter-rotating propellers (doublet of variable pitch unducted "Open Rotor" or ducted "Contrafan" counter-rotating propellers), in which the servo-controlled operating parameters comprise the speed of revolution of the low pressure body (NBP) and the speeds of revolution of the two propellers (N1 and N2), the controlled parameters comprising the fuel flow (WF) and the pitches of the propellers ($\beta_1$ and $\beta_2$).

For the control of a turbojet engine with a piloted nozzle section, the servo-controlled operating parameters comprise the speed of revolution of the low pressure body (NBP) and the position of the cylinder(s) (xT) controlling the settable section of the nozzle, the controls comprising the fuel flow (WF) and the servo valve current (iTuy) power supplying the cylinder(s).

In the case of controlling a turbojet engine having variable geometries, the servo-controlled operating parameters comprise the speed of revolution of the low-pressure body (NBP) and the positions of the cylinders (xVSV and xVBV) (other operating parameters such as the booster operability line can also be considered), and the controls comprise the fuel flow WF and the servo valve control currents (iVSV and iVBV).

PRESENTATION OF THE FIGURES

Other characteristics and advantages of the invention will also emerge from the following description, which is purely illustrative and not limiting, and should be read with reference to the appended figures in which:

FIG. 1 schematically illustrates a centralized regulation system of the prior art;

FIG. 2 schematically illustrates a state feedback regulation system of the prior art;

FIG. 3 schematically illustrates a state feedback decoupling system of the prior art;

FIG. 4 schematically illustrates a frequency decoupling method of the prior art;

FIG. 5 a mixed strategy control system in accordance with a possible embodiment of the invention;

DESCRIPTION OF ONE OR MORE EMBODIMENTS

Figure 5:
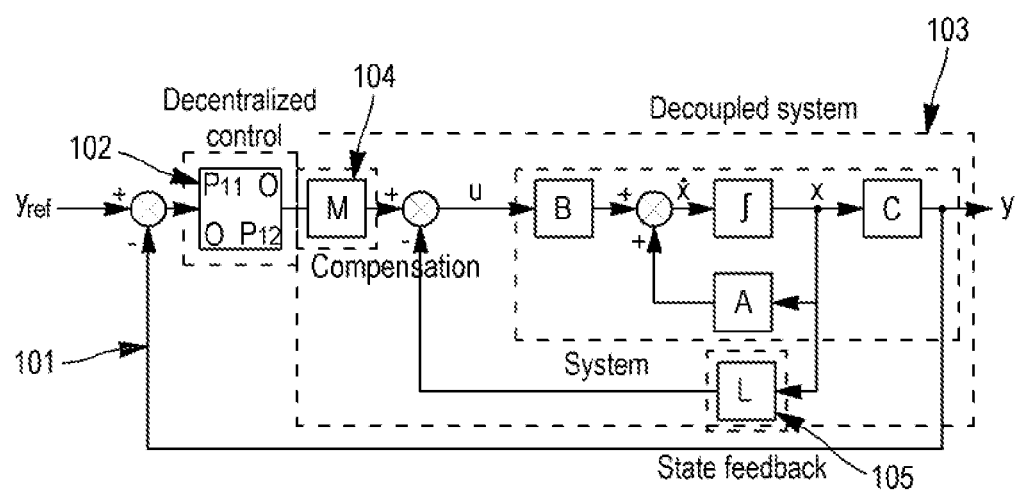

In the example illustrated in FIG. 5, we are in the case of two setpoints, controls and outputs, this architecture and the setting method being generalized in what follows to N setpoints, controls and outputs.

The architecture of this control system 100 comprises:
- a decentralized control loop 101 with compensators;
- a state feedback decoupling system 103 integrated into said loop 101.

The loop 101 receives N setpoints Yref and comprises a decentralized control 102 the outputs of which supply the state feedback decoupling system 103 and the correctors of which are selected to allow the loop 101 to perform the servo-control function of the method.

State Feedback Decoupling

Figure 6:
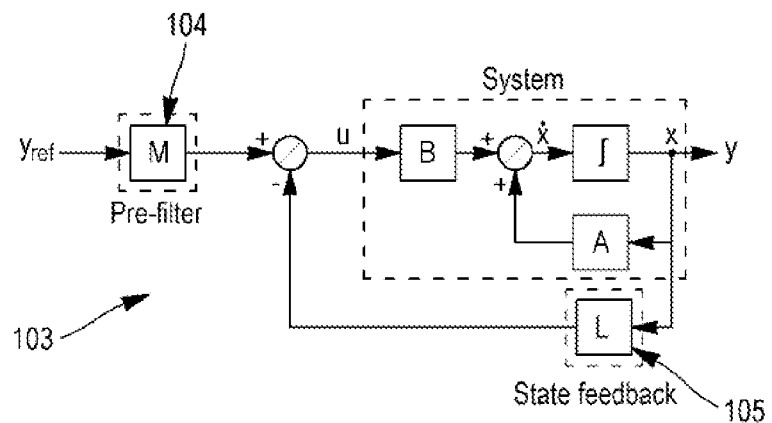
FIG. 6 illustrates the state feedback control of the system of FIG. 5.

The state feedback decoupling system is more particularly shown in FIG. 6 and includes:
- a static compensator 104 configured to decouple the setpoints at the output of the decentralized control 101 (pre-filter matrix M (or compensation matrix));
- a state feedback corrector 105 (state feedback matrix L).

In what, it is assumed that the following assumptions are met:

The method is linear.

The number of controls is equal to the number of outputs to be servo-controlled. This is a conventional assumption for decoupling (and it is in any case not possible to decouple a system if one does not have the necessary number of degrees of freedom).

The direct action matrix is zero. This is a conventional assumption naturally respected by the majority of state feedback control systems (the controls do not instantly act on outputs).

The control matrix B is invertible.

The method does not include an unstable zero (just like the other state feedback decoupling methods, an unstable zero would introduce an unstable pole in the solution).

Also, we are in the case where the number of states of the system is equal to the number of outputs (all the states considered are measured). In this case, it is possible to adjust A and B so as to consider the output matrix C as the identity matrix.

This assumption can nevertheless be circumvented. In particular, in the case where the system has a number of states greater than the number of inputs/outputs, an observer can be added.

Figure 1:
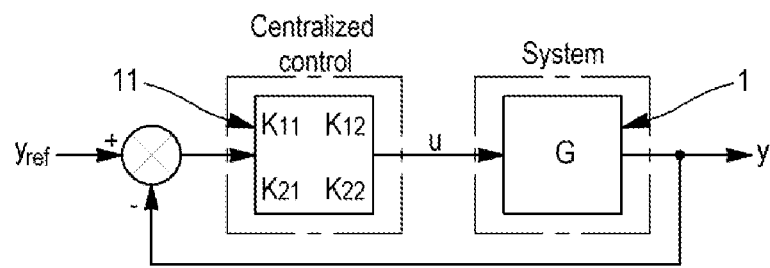
Figure 2:
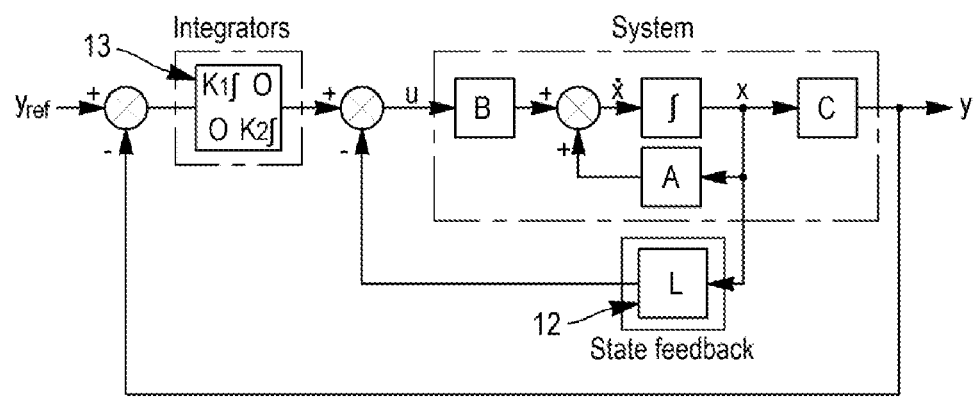
Figure 3:
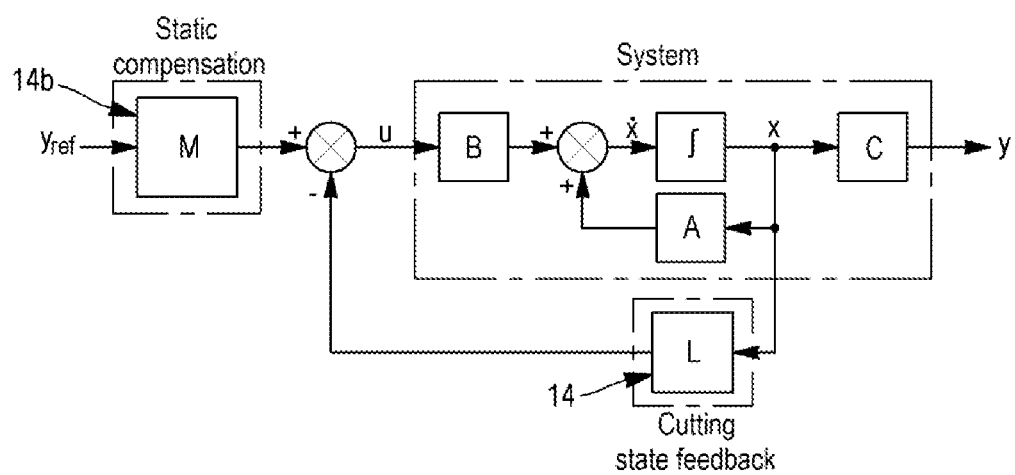
Figure 4:
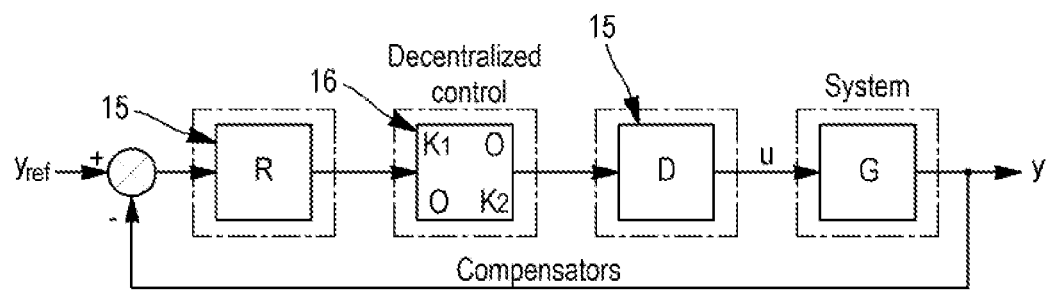

Given the assumptions set out above, the output matrix C of the diagram of FIG. 3 is equal to the identity by assumption, such that:

$$y = x \text{ and } \dot{y} = \dot{x}$$

The state representation d is written as follows:

$$\dot{x} = A\dot{x} + Bu$$

$$y = x$$

$x(t) \in \mathbb{R}^n$: column representing the N state variables
$u(t) \in \mathbb{R}^m$: column representing the N controls
$y(t) \in \mathbb{R}^p$: column representing the N outputs
$A \in \mathbb{R}^{n \times n}$: State matrix
$B \in \mathbb{R}^{n \times m}$: Control matrix so that the considered system can be fully represented by (1) below. The notations of (2) being thereafter adopted.

$$\begin{bmatrix} \dot{x}_1 \\ \vdots \\ \dot{x}_N \end{bmatrix} = \begin{bmatrix} A_{11} & \cdots & A_{1N} \\ \vdots & \ddots & \vdots \\ A_{N1} & \cdots & A_{NN} \end{bmatrix} \begin{bmatrix} x_1 \\ \vdots \\ x_N \end{bmatrix} + \begin{bmatrix} B_{11} & \cdots & B_{1N} \\ \vdots & \ddots & \vdots \\ B_{N1} & \cdots & B_{NN} \end{bmatrix} \begin{bmatrix} u_1 \\ \vdots \\ u_N \end{bmatrix} \quad (1)$$

$$y = \begin{bmatrix} y_1 \\ \vdots \\ y_N \end{bmatrix}; y_{ref} = \begin{bmatrix} y1_{ref} \\ \vdots \\ yN_{ref} \end{bmatrix}; u = \begin{bmatrix} u_1 \\ \vdots \\ u_N \end{bmatrix}; x = \begin{bmatrix} x_1 \\ \vdots \\ x_N \end{bmatrix} \quad (2)$$

The control thus performed by the decoupling system of FIG. 6 is therefore such that:

$$\dot{x} = Ax + Bu = (A - BL)x + BMy_{ref} \quad (3)$$

L and M are in turn selected such that:

$$\begin{cases} L = B^{-1}\left(A - \begin{bmatrix} -p_1 & 0 & 0 \\ 0 & \ddots & 0 \\ 0 & 0 & -p_N \end{bmatrix}\right) \\ M = B^{-1} \begin{bmatrix} G_1 & 0 & 0 \\ 0 & \ddots & 0 \\ 0 & 0 & G_N \end{bmatrix} \end{cases} \quad (4)$$

where the parameters $p_i$ and $G_i$ are scalar values.
Such a control indeed allows a perfect decoupling:
each element of $\dot{x}$ depends only on the corresponding element thereof in the vector x (for example, $\dot{x}_i$ must depend only on $x_i$ and not on the other elements of x),
each element of $\dot{x}$ is only influenced by the corresponding element thereof in the vector u (for example, $\dot{x}_i$ is only affected by $u_i$ and not by the other elements of u).
With such matrices L and M indeed:

$$(A - BL) = \begin{bmatrix} -p_1 & 0 & 0 \\ 0 & \ddots & 0 \\ 0 & 0 & -p_N \end{bmatrix} \quad (5)$$

$$BM = \begin{bmatrix} G_1 & 0 & 0 \\ 0 & \ddots & 0 \\ 0 & 0 & G_N \end{bmatrix} \quad (6)$$

(7) is obtained by combining expressions (3), (5) and (6). The transition to (8) and (9) only uses the fact that $\dot{y} = \dot{x}$ and $y = x$.

$$\dot{x} = (A - BL)x + BMy_{ref} = \begin{bmatrix} -p_1 & 0 & 0 \\ 0 & \ddots & 0 \\ 0 & 0 & -p_N \end{bmatrix} x + \begin{bmatrix} G_1 & 0 & 0 \\ 0 & \ddots & 0 \\ 0 & 0 & G_N \end{bmatrix} y_{ref} \quad (7)$$

$$\dot{y} = \begin{bmatrix} -p_1 & 0 & 0 \\ 0 & \ddots & 0 \\ 0 & 0 & -p_N \end{bmatrix} y + \begin{bmatrix} G_1 & 0 & 0 \\ 0 & \ddots & 0 \\ 0 & 0 & G_N \end{bmatrix} y_{ref} \quad (8)$$

$$\begin{bmatrix} \dot{y}_1 \\ \vdots \\ \dot{y}_N \end{bmatrix} = \begin{bmatrix} -p_1 & 0 & 0 \\ 0 & \ddots & 0 \\ 0 & 0 & -p_N \end{bmatrix} \begin{bmatrix} y_1 \\ \vdots \\ y_N \end{bmatrix} + \begin{bmatrix} G_1 & 0 & 0 \\ 0 & \ddots & 0 \\ 0 & 0 & G_N \end{bmatrix} \begin{bmatrix} y1_{ref} \\ \vdots \\ yN_{ref} \end{bmatrix} \quad (9)$$

Passing in the Laplace domain, this amounts to having:

$$\begin{bmatrix} y_1 \\ \vdots \\ y_N \end{bmatrix} = \begin{bmatrix} \frac{G_1}{s + p_1} & 0 & 0 \\ 0 & \ddots & 0 \\ 0 & 0 & \frac{G_N}{s + p_N} \end{bmatrix} \begin{bmatrix} y1_{ref} \\ \vdots \\ yN_{ref} \end{bmatrix} \quad (10)$$

Thus, the responses of the system are decoupled and correspond to first order transfer functions with the poles $p_i$ and the gains $G_i$.

The gain $G_i$ and pole $p_i$ values are determined by approaching the diagonal terms of the method by the first orders of the equation (10). Different reduction techniques allow arriving at the choice of the gains $G_i$ and the poles $p_i$ from the diagonal transfers of the system.

To this end, for example, the model reduction techniques are used, such as for example the truncation technique, and by comparing the frequency responses of the original transfers and those of the reduced transfers, emphasizing the conservation of the static gain and the cutoff frequency.

In particular, the gains $G_i$ and the poles $p_i$ can be selected so that the static gains and cutoff frequencies are similar.

It will be noted that with the proposed control, the decoupling carried out is total, the servo setting being carried out not at the state feedback loop 103, but at the correctors/compensators of the loop 101.

Thus, unlike the method called Falb-Wolovich method [Multivariable control and estimation, Ostertag, 2006], the purpose of the state feedback system is not to servo-control the method but to decouple it.

This allows the gains of the correctors (see below) to best preserve the transfer dynamics.

Mono-Variable Correctors

The correctors for the decentralized control 102 are selected in order to adjust the desired servo-control from the decoupled system.

Particularly when these correctors are PI correctors, their relatively simple structure considerably facilitates the settings. Indeed, the shape of the PI correctors allows keeping a certain physical sense, which makes the settings more intuitive. Then, they can be adjusted independently of the decoupling, during tests on test benches.

When another decoupling method is used and the decoupling is not total, it is necessary to use synthesis methods called multi-loop synthesis methods ("detuning" methods, sequential methods, . . . ). The latter allow taking into account the interactions between the loops SHP and XNP during the synthesis of the correctors but are more complex than the conventional setting methods.

Since the state feedback decoupling is complete, conventional setting methods can be used to set the correctors. These methods are simple to implement because the settings can be carried out independently to servo-control the outputs of the system.

The PID-IMC (Internal Model Control) method can in particular be used to carry out these settings, from the transfer functions of the decoupled method and specifications translated in the form of first order transfer functions. The settings of the PI regulators are relatively simple and can be done automatically from this method, transfer functions of the decoupled method, and specifications.

Other mono-variable correctors and other setting methods can nevertheless be used instead of the PID-IMC method.

Parameterization

The control system is thus parameterized according to a parameterization method including steps consisting in:
E1 defining a model of the considered mechanical engine system;
E2 defining a state feedback corrector 105 and a static compensator 104 so as to decouple the controlled output parameters, while preserving the main dynamics of the system;
E3 defining the correctors of the decentralized control 102 (for example, mono-variable PI correctors) so as to servo-control the output parameters according to the desired law.

Optionally, the method may include a step E4 of interpolating the correctors of the decentralized control 102, the state feedback corrector 105 and the static compensator 104.

Application to the Turboprop

Figure 7:
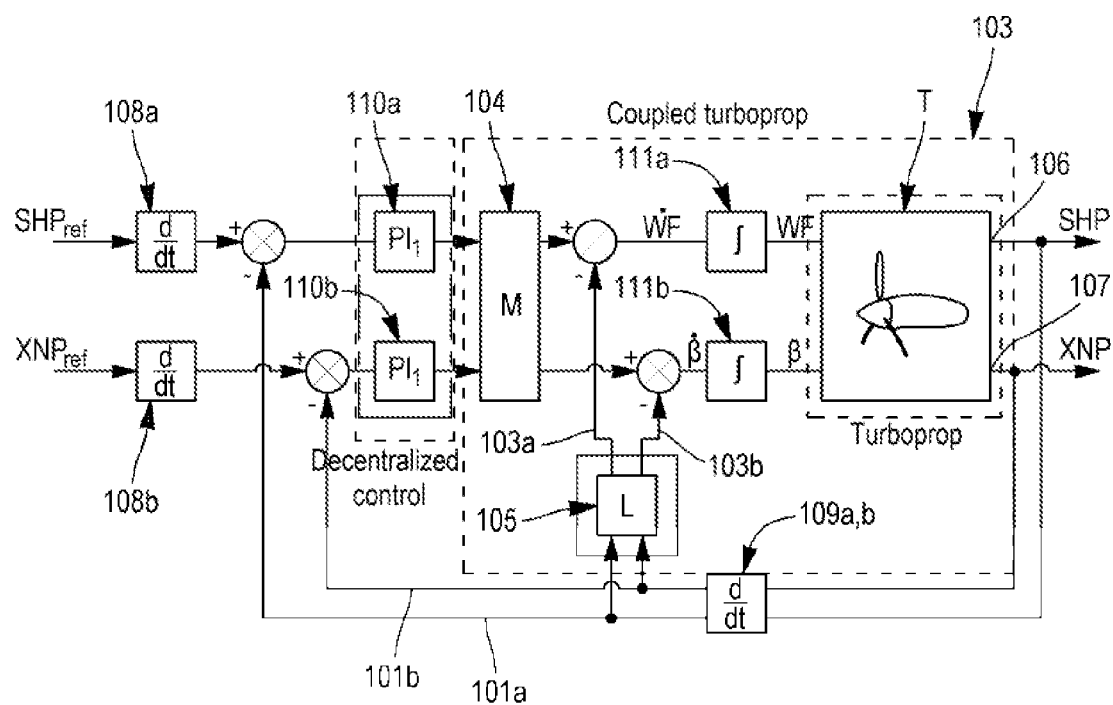
FIG. 7 illustrates an example of application of the invention to the control of turboprop.

FIG. 7 illustrates an application to the control of a turboprop T.

The control system illustrated in this figure receives as input setpoints of propeller power SHPref and propeller speed of rotation XNPref.

These setpoints are for example generated by a management unit (not shown) calculating said power and speed setpoints from a thrust setpoint which is in turn supplied by a control device 18, typically a stick.

Said system outputs the propeller power SHP and the propeller speed of rotation XNP of the turboprop, which are measured by a propeller power SHP sensor 106 and a propeller speed of rotation XNP sensor 107.

The system includes two global control loops 101a and 101b, one (101a) which servo-controls the power SHP on the power setpoint SHPref, the other (101b) which servo-controls the propeller speed of rotation XNP on the setpoint of the propeller speed of rotation XNPref.

A deriver 108a is placed at the input of the global power loop SHP 101a, and a deriver 108b is placed at the input of the global speed of rotation loop of the propeller XNP 101b.

Also, derivers 109a and 109b receive as input the propeller power SHP and the speed of rotation XHP and send them back on the feedback inputs of both loops 101a and 101b.

Each of these two loops 101a, 101b in turn includes a decentralized control 110a, 110b and two decoupling loops 103a, 103b supplied respectively by the outputs of the decentralized controls 110a, 110b.

Each decentralized control 110a, 110b receives as input the error signal of the loop to which it corresponds.

The decentralized control 110a includes a mono-variable power corrector SHP configured to servo-control the power SHP on the setpoint of SHPref, while the decentralized control 110b includes a mono-variable speed corrector configured to servo-control the speed XNP on the setpoint of XNPref.

The decoupling loops 103a, 103b incorporate a state feedback corrector 105 configured to decouple the propeller power SHP and the propeller speed of rotation XNP of the turboprop 1 from the point of view of the states of the system.

Said corrector 105 receives as input the outputs of the derivers 109a and 109b.

The outputs of the corrector 105 form the feedback inputs of said loops 103a and 103b, which receive on their other input the outputs of a static compensator 104.

Also, said loops 103a, 103b include respectively an integrator 111a positioned before the input of the fuel flow control WF of the turboprop T and an integrator 111b positioned before the input of the pitch control of the propeller B of the turboprop T.

These two integrators 111a and 111b respectively generate a fuel flow control WF and a propeller B pitch control for the turboprop T.

A certain number of characteristic operating points are defined. These characteristic operating points are characterized by flight conditions (Mach, altitude) and states of the turboprop.

Identification scenarios are simulated during the design phase for each of these characteristic operating points from a non-linear thermodynamic model of the engine. The control used for these identification scenarios is typically a series of desynchronized control levels with white noise.

The results of these simulations are then used to characterize the behavior of the turboprop and define a linear turboprop model modeling the operation of the turboprop and having as inputs a fuel flow WF and a propeller B pitch and as outputs a propeller power SHP and a propeller speed of rotation XNP.

After analyzing the results, a turboprop model of order 2 is selected. The turboprop model therefore has two state variables, the order of the system being equal to the number of state variables.

Since the number of state variables being equal to both the number of inputs and the number of outputs of the turboprop model, it is possible to directly associate the state variables with the outputs of the turboprop model. The state variables of the turboprop model are therefore the propeller power SHP and the propeller speed of rotation XNP.

Steps E2 and E3 use a computer-assisted numerical simulation of the operation of the turboprop using the turboprop model defined in step E1.

The analysis of this data has led to the search for models of order 2 and without direct action.

The transfer matrices of the identified linear systems have the form (11) in the form of state and (12) in the form of transfer matrix. After analyzing the zeros and the matrices B of the linear systems on all the operating points, it appears that the former are quite stable and that the matrices B are invertible.

The mixed decentralized control strategy is therefore applicable.

$$\begin{bmatrix} S\dot{H}P \\ X\dot{N}P \end{bmatrix} = \begin{bmatrix} A_{11} & A_{12} \\ A_{21} & A_{22} \end{bmatrix} \begin{bmatrix} SHP \\ XNP \end{bmatrix} + \begin{bmatrix} B_{11} & B_{12} \\ B_{21} & B_{22} \end{bmatrix} \begin{bmatrix} WF \\ \beta \end{bmatrix} \quad (11)$$

$$\begin{bmatrix} SHP \\ XNP \end{bmatrix} = \begin{bmatrix} \dfrac{K_{11}(s+z_{11})}{(s+p_A)(s+p_B)} & \dfrac{K_{12}(s+z_{12})}{(s+p_A)(s+p_B)} \\ \dfrac{K_{21}(s+z_{21})}{(s+p_A)(s+p_B)} & \dfrac{K_{22}(s+z_{22})}{(s+p_A)(s+p_B)} \end{bmatrix} \begin{bmatrix} WF \\ \beta \end{bmatrix} \quad (12)$$

Based on this observation, the approach of determining the parameters presented above for each of the identified systems is applied.

The first step (E1) automatically searches for the main dynamics of the diagonal transfers of the turboprop on each of the identified models. This can be done automatically via some model reduction techniques, such as that of truncating the balanced base. It is thus possible to find transfers of the first order which approach the diagonal transfers composed of two poles and a zero. Thus, G1, G2, p1 and p2 are deduced therefrom. Preferably, the gains Gi and the poles pi are selected so that the static gain of the frequency responses of the reduced transfers does not depart from the static gain of the frequency responses of the original transfers, and so that the cutoff frequency of the frequency responses of the reduced transfers does not depart from the cutoff frequency of the frequency responses of the original transfers.

In the second step (E2), the matrices M and L are determined analytically on each operating point by applying (10).

The third step (E3) implements a determination of the PI correctors for the power SHP and propeller speed of revolution XNP loops. This is again carried out analytically via the PID-IMC technique.

The matrices M, L and the PI correctors evolve over the flight envelope to compensate for the variability of the system. In order to maximize the performance of the regulation, the control laws are interpolated according to the flight conditions (Mach, altitude, turboprop state).

The PI regulators are therefore interpolated in order to increase the performance of the system (static error, response time, overshoot) and the matrices M and L in order to maintain an optimal decoupling.

Interpolating the correctors allows increasing the performance of the control system (and in particular in terms of static error, response time, and overshoot).

Interpolating the state feedback corrector 105 and the static compensator 104 allows optimal decoupling to be maintained over the entire flight envelope.

Particularly, the parameters of the mono-variable correctors can be interpolated individually by gain sequencing.

Gain sequencing consists in determining a family of linear systems, approaching the non-linear system at a given number of operating points, and in proposing control laws in each of the associated regions of the state space, to finally achieve a global control law.

Particularly, when the mono-variable correctors are PI correctors, the gain interpolation is simple since it is a sum of different actions weighted by gains. Likewise, the state feedback corrector 105 and the static compensator 104 are gain matrices (of size 2×2) L and M, it is therefore relatively simple to interpolate the coefficients of these matrices.

An incremental algorithm can be used to smooth the controls when interpolating the control laws and to allow smoother transitions when several regulation loops are in competition. The setpoints and outputs are thus derived (derivers 108a, 108b and 109a, 109b) which allows working with error increments, the control increments being then integrated.

The control laws allow optimal responses to be achieved over the entire flight envelope, with relatively simple and easily adjustable control laws.

Application to Other Systems

The steps to achieve solutions in the case of other applications are the same as in the case of the turboprop.

In the case of a propulsion unit comprising a doublet of unducted "Open Rotor" or ducted "Contrafan" counter-rotating propellers, the controls comprise the fuel flow WF and the pitches of the propellers $\beta_1$ and $\beta_2$. The outputs in turn comprise the speed of revolution of the low pressure body $N_{BP}$ and the speeds of revolution of the two propellers $N_1$ and $N_2$, as shown below:

$$y = \begin{bmatrix} N_{BP} \\ N_1 \\ N_2 \end{bmatrix}; x = \begin{bmatrix} WF \\ \beta_1 \\ \beta_2 \end{bmatrix} \quad (13)$$

The system linearized over the different operating points is described by a full 3×3 transfer matrix (all the terms are non-zero). The different assumptions are well respected, which allows leading to the matrices L and M described in (10).

In the case of turbojet engines with piloted nozzle section, the controls comprise the fuel flow WF and the servo valve current $i_{Tuy}$ power supplying the cylinder allowing to vary the settable section of the nozzle. The outputs in turn comprise the speed of revolution of the low pressure body $N_{BP}$ and the consolidated position of the cylinders $x_{Tuy}$:

$$y = \begin{bmatrix} N_{BP} \\ x_{Tuy} \end{bmatrix}; x = \begin{bmatrix} WF \\ i_{Tuy} \end{bmatrix} \quad (14)$$

The system is linearized over a smaller number of operating points. The linearized system corresponds to a 2×2 matrix, but the transfer WF→$x_{Tuy}$ is zero (the variation in fuel flow has no direct impact on the position of the nozzle). Thus, the other coupling term namely $i_{Tuy}$→$N_{BP}$ must be minimized. However, this does not change the assumptions and formula (10) can be applied.

In the case of turbojet engines having variable geometries, the controls comprise the fuel flow WF and the control currents of the servo valves $i_{VSV}$ and $i_{VBV}$ allowing the cylinders to be power supplied to respectively optimize the angle of the stators (VSV for Variable Stator Vanes) of the high pressure compressor and modulate the opening bias of the relief valves (VBV for Variable Bleed Valves). The servo-controlled outputs comprise the speed of revolution of the low pressure body $N_{BP}$ and the positions of the cylinders $x_{VSV}$ and $x_{VBV}$. The setpoints of these actuators are in turn perfectly synchronized.

$$y = \begin{bmatrix} N_{BP} \\ x_{VSV} \\ x_{VBV} \end{bmatrix}; x = \begin{bmatrix} WF \\ i_{VSV} \\ i_{VBV} \end{bmatrix} \quad (15)$$

The system linearized over the different operating points is described by a 3×3 transfer matrix. The preponderant terms are the diagonal terms and the transfers WF→$x_{VSV}$ and WF→$x_{VBV}$ are zero. The other coupling terms, on the other hand, are non-zero (the action of VBVs directly impacts the low pressure regime, and the action of VSVs also impacts it via the high pressure regime). Again, the solution can be applied.

The invention claimed is:

1. An aircraft engine control system, comprising:
at least one servo-loop which receives as input parameter setpoints on the engine operating parameters and which controls the system with a feedback loop on these operating parameters, said servo-loop including a mono-variable regulator decentralized control,
at least one state feedback control integrated into the servo-loop, said control receiving as input the outputs of the mono-variable regulator decentralized control and being a feedback loop between the operating parameters of the engine and the outputs of said decentralized control, said feedback loop providing the engine control parameters,
the state feedback control being configured to decouple the operating parameters, the mono-variable regulators of the decentralized control being configured to servo-control the operating parameters on the setpoints of these parameters.

2. The system according to claim 1, wherein the feedback control including a static compensator and a state feedback corrector loop, said static compensator and said state feedback corrector loop being configured to decouple the operating parameters.

3. The engine control system according to claim 1, wherein the mono-variable regulators of the decentralized control are proportional correctors/integrators.

4. A method for parameterizing an aircraft engine control system according to claim 1, including the steps of:
defining a linear engine model, the model having a transfer function and a state representation;
defining a static compensator and a state feedback corrector so as to decouple the states constituted by the operating parameters of the engine to be servo-controlled;
defining the mono-variable regulators so as to servo-control said operating parameters on the setpoints.

5. The method for parameterizing a control system according to claim 4, wherein the state feedback corrector and the static compensator are configured so that the transfer function of the control system has gains and poles corresponding to those of the transfer function of the engine model.

6. The method for parameterizing a control system according to claim 4, further including a step of interpolating the mono-variable correctors depending on flight condition variables.

7. The method for parameterizing a control system according to claim 6, wherein the parameters of the mono-variable correctors are interpolated individually by gain sequencing.

8. The method for parametrizing a control system according to claim 4, further including a step of interpolating the state feedback corrector and the static compensator depending on flight condition variables ($C_1$, $C_2$, $C_3$, . . . ).

9. A use of a system according to claim 1 for controlling an engine having a variable pitch propeller, such as a turboprop, wherein the servo-controlled operating parameters comprise the power of the propeller (SHP) and the speed of rotation (XNP) thereof, the controlled parameters comprising the fuel flow and the propeller pitch.

10. The use of a system according to claim 1 for controlling an engine having a doublet of variable pitch counter-rotating propellers, wherein the servo-controlled operating parameters comprise the speed of revolution of the low pressure body (NBP) and the speeds of revolution of the two propellers (N1 and N2), the controlled parameters comprising the fuel flow (WF) and the pitches of the propellers ($\beta_1$ and $\beta_2$).

11. The use of a system according to claim 1 for controlling a turbojet engine with piloted nozzle section, wherein the controlled operating parameters comprise the speed of revolution of the low pressure body (NBP) and the position of the cylinder(s) (xT) controlling the settable section of the nozzle, the controls comprising the fuel flow (WF) and the servo valve current (iTuy) power supplying the cylinder(s).

12. The use of a system according to claim 1 for controlling a turbojet engine having variable geometries, wherein the servo-controlled operating parameters comprise the speed of revolution of the low pressure body (NBP) and the positions of the cylinders (xVSV and xVBV), the controls comprising the fuel flow (WF) and the servo valve control currents (iVSV and iVBV).

* * * * *